United States Patent
Zhou et al.

(10) Patent No.: US 11,663,679 B2
(45) Date of Patent: May 30, 2023

(54) GENERATING MODE CHANGE ALERTS WITH AUTOMATIC DETECTION FROM SENSOR DATA

(71) Applicant: International Business Machines Corporation, Armonk, NY (US)

(72) Inventors: Nianjun Zhou, Danbury, CT (US); Dharmashankar Subramanian, Yorktown Heights, NY (US); Patrick Watson, Montrose, NY (US); Pavankumar Murali, Ardsley, NY (US); Wesley M Gifford, Ridgefield, CT (US); Jayant R Kalagnanam, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 139 days.

(21) Appl. No.: 16/599,505

(22) Filed: Oct. 11, 2019

(65) Prior Publication Data
US 2021/0110487 A1    Apr. 15, 2021

(51) Int. Cl.
*G06Q 50/04* (2012.01)
*G06F 17/17* (2006.01)
(Continued)

(52) U.S. Cl.
CPC ....... *G06Q 50/04* (2013.01); *G05B 19/41835* (2013.01); *G06F 17/17* (2013.01);
(Continued)

(58) Field of Classification Search
None
See application file for complete search history.

(56) References Cited

U.S. PATENT DOCUMENTS

| 4,117,343 A | 9/1978 | Hoffeins |
| 4,211,089 A | 7/1980 | Mueller et al. |

(Continued)

FOREIGN PATENT DOCUMENTS

| CN | 1339659 A | 3/2002 |
| CN | 105388876 A | 3/2016 |

(Continued)

OTHER PUBLICATIONS

Eggels et al., Clustering based collocation for uncertainty propagation with multivariate dependent inputs, (Year: 2017).*

(Continued)

*Primary Examiner* — Chesiree A Walton
(74) *Attorney, Agent, or Firm* — Patterson + Sheridan, LLP

(57) ABSTRACT

A system and a method of managing a manufacturing process includes receiving production data relating to the manufacturing process and determining an operational mode associated with the manufacturing process using historical, multivariate senor data. The method may further determine a recommended action to affect production based on the determined operational mode. The operational mode may be based on at least one of: a level of operation in a continuous flow process relating to a joint set of process variables, a representation of a joint dynamic of the set of process variables over a predefined length, and a joint configuration of an uptime/downtime of a plurality of units comprising a process flow.

14 Claims, 7 Drawing Sheets

(51) Int. Cl.
*G06Q 10/06* (2012.01)
*G06N 3/08* (2006.01)
*G05B 19/418* (2006.01)
*H04L 67/10* (2022.01)

(52) U.S. Cl.
CPC .......... *G06N 3/08* (2013.01); *G06Q 10/0633* (2013.01); *G06Q 10/06316* (2013.01); *G05B 2219/31372* (2013.01); *H04L 67/10* (2013.01)

(56) References Cited

U.S. PATENT DOCUMENTS

| | | | |
|---|---|---|---|
| 6,075,569 A | 6/2000 | Lee et al. | |
| 6,609,036 B1 | 8/2003 | Bickford | |
| 6,671,570 B2 | 12/2003 | Schulze | |
| 7,802,618 B2 | 9/2010 | Simon et al. | |
| 7,848,831 B2 | 12/2010 | Wang | |
| 7,962,472 B2 | 6/2011 | Erickson et al. | |
| 10,140,253 B2 | 11/2018 | Blevins et al. | |
| 2004/0117766 A1 | 6/2004 | Mehta et al. | |
| 2006/0224254 A1 | 10/2006 | Rumi et al. | |
| 2007/0142935 A1* | 6/2007 | Danielsson | G06F 8/10 700/29 |
| 2008/0140246 A1 | 6/2008 | Kang | |
| 2012/0250517 A1 | 10/2012 | Saarimaki et al. | |
| 2014/0197316 A1 | 7/2014 | Kadali et al. | |
| 2015/0026107 A1 | 1/2015 | Vijayaraghavan et al. | |
| 2015/0316904 A1 | 11/2015 | Govindaraj et al. | |
| 2018/0087359 A1 | 3/2018 | Conn et al. | |
| 2019/0056722 A1* | 2/2019 | Abbaszadeh | G06F 21/55 |
| 2019/0180165 A1 | 6/2019 | Vinyals et al. | |
| 2019/0303143 A1* | 10/2019 | Beard | G06F 9/3877 |
| 2019/0311273 A1* | 10/2019 | Cohen | G06N 5/02 |
| 2019/0339688 A1* | 11/2019 | Cella | G05B 19/41865 |
| 2019/0369604 A1 | 12/2019 | Michalscheck et al. | |
| 2019/0384255 A1* | 12/2019 | Krishnaswamy | G05B 23/024 |
| 2020/0033316 A1 | 1/2020 | Long et al. | |
| 2020/0150634 A1* | 5/2020 | Gray | G05B 19/41835 |
| 2021/0026314 A1 | 1/2021 | Phan et al. | |
| 2021/0064983 A1* | 3/2021 | Mai | G06N 3/04 |
| 2021/0110487 A1 | 4/2021 | Zhou et al. | |
| 2022/0011760 A1 | 1/2022 | Zhou et al. | |

FOREIGN PATENT DOCUMENTS

| | | |
|---|---|---|
| CN | 105930955 A | 9/2016 |
| CN | 106529800 A | 3/2017 |
| CN | 106529820 A | 3/2017 |
| CN | 108242411 A | 7/2018 |
| CN | 108345726 A | 7/2018 |
| CN | 109800483 A | 5/2019 |
| KR | 101527080 B1 | 6/2015 |
| WO | 2019246008 A1 | 12/2019 |
| WO | 2020023998 A1 | 2/2020 |

OTHER PUBLICATIONS

Kresta, Jim. Advanced Process Control Of Extraction: Sensors And Models, Paper presented at the SPE International Heavy Oil Symposium, Calgary, Alberta, Canada, Jun. 1995. (Year: 1995).*

Wong, Timothy et al. Recurrent Auto-Encoder Model for Large-Scale Industrial Sensor Signal Analysis, Publisher: E. Pimenidis and C. Jayne (Eds.): EANN 2018, CCIS 893, Jul. 10, 2018 (Year: 2018).*

Khodabakhsh et al. Multivariate Sensor Data Analysis for Oil Refineries and Multi-mode Identification of System Behavior in Real-time, IEEE, Oct. 22, 2018 (Year: 2018).*

Rezvani et al. Lagrangian-Based Pattern Extraction for Edge Computing in the Internet of Things, 2019 6th IEEE International Conference on Cyber Security and Cloud Computing (CSCloud)/ 2019 5th IEEE International Conference on Edge Computing and Scalable Cloud, Date of Conference:Jun. 21-23, 2019 (Year: 2019).*

Guyon et al., Model Selection: Beyond the Bayesian/ Frequentist Divide, Journal of Machine Learning Research 11 (2010) pp. 61-87 (Year: 2010).*

Chu et al., "Fault Detection and Operation Mode Identification Based on Pattern Classification with Varible Selection," Industrial & Engineering Chemistry Research 43(7), Mar. 2004 (Abstract Only).

Wong, T., & Luo, Z. (Jul. 2018). Recurrent auto-encoder model for large-scale industrial sensor signal analysis. Retrieved from https://arxiv.org/pdf/1807.03710.

Saurav, S. et al. (Jan. 2018). Online anomaly detection with concept drift adaptation using recurrent neural networks. Proceedings of the ACM India Joint International Conference on Data Science and Management of Data—CoDS-COMAD'18. doi:10.1145/3152494. 3152501.

Le, Q. V. (Oct. 2015). A tutorial on deep learning part 2: Autoencoders, convolutional neural networks and recurrent neural networks. Google Brain, Google Inc. Retrieved from http://robotics.stanford.edu/~quocle/tutorial2.pdf.

PCT, Notification of Transmittal of The International Search Report and The Written Opinion of The International Searching Authority, or The Declaration for Application PCT/CN2021/121060 dated Dec. 29, 2021.

IBM, "List of Patent Applications Treated as Related," 2 pages.

* cited by examiner

GENERATING MODE CHANGE ALERTS WITH AUTOMATIC DETECTION FROM SENSOR DATA

BACKGROUND

The present invention relates to managing plant and production facilities, and more specifically, to using automated computer algorithms and hardware to determine and monitor production metrics.

A mode may include a status of plant operation. A hard category type of a mode may regard a specific operational configuration of an entire production process, such as manufacturing a pipe configuration, a unit operation status. A soft category type of a mode may include a production level of local or global operations.

In the sand oil industry, there is a complex process of converting sand oil into SCO (Synthesis Crude Oil). To complete a SCO production generation, there are multiple stages involved, including primary extraction, secondary extraction, and upgrading. Each stage involves multiple components and processes, and the system is a dynamic system. Some of the involved modes are explicitly known by site-wide-leaders. Other modes are hidden and can identified through advanced analytic models.

In a typical configuration, operation performs at full capacity when enough raw material is available from mining and all of the components are functioning properly. An upgrading process operation may be performed without a vacuum process. A low production mode may result when a quality of bitumen from processed oil sand is low (e.g., with a high concentration of chloride) to avoid degradation of a coking unit. Operation in partial capability may occur when a raw material train line is undergoing maintenance.

SUMMARY

According to a particular embodiment, a method of managing a manufacturing process includes receiving production data relating to the manufacturing process and determining an operational mode associated with the manufacturing process using historical, multivariate senor data. The method may further determine a recommended action to affect production based on the determined operational mode. The operational mode may be based on at least one of: a level of operation in a continuous flow process relating to a joint set of process variables, a representation of a joint dynamic of the set of process variables over a predefined length, and a joint configuration of an uptime/downtime of a plurality of units comprising a process flow.

According to another particular embodiment, a system comprises a mode module configured to receive production data relating to the manufacturing process and to determine an operational mode associated with the manufacturing process using historical, multivariate senor data; and a recommendation module to generate a recommended action to affect production based on the determined operational mode, where the operational mode is based on at least one of: a level of operation in a continuous flow process relating to a joint set of process variables, a representation of a joint dynamic of the set of process variables over a predefined length, and a joint configuration of an uptime/downtime of a plurality of units comprising a process flow.

According to another particular embodiment, computer program product to determine an operational mode of a production system from sensor data, the computer program product comprising a computer-readable storage medium having computer-readable program code embodied therewith, the computer-readable program code executable by one or more computer processors to receive production data relating to the manufacturing process; determine an operational mode associated with the manufacturing process using historical, multivariate senor data; and determine a recommended action to affect production based on the determined operational mode, where the operational mode is based on at least one of: a level of operation in a continuous flow process relating to a joint set of process variables, a representation of a joint dynamic of the set of process variables over a predefined length, and a joint configuration of an uptime/downtime of a plurality of units comprising a process flow.

DETAILED DESCRIPTION

Figure 1:
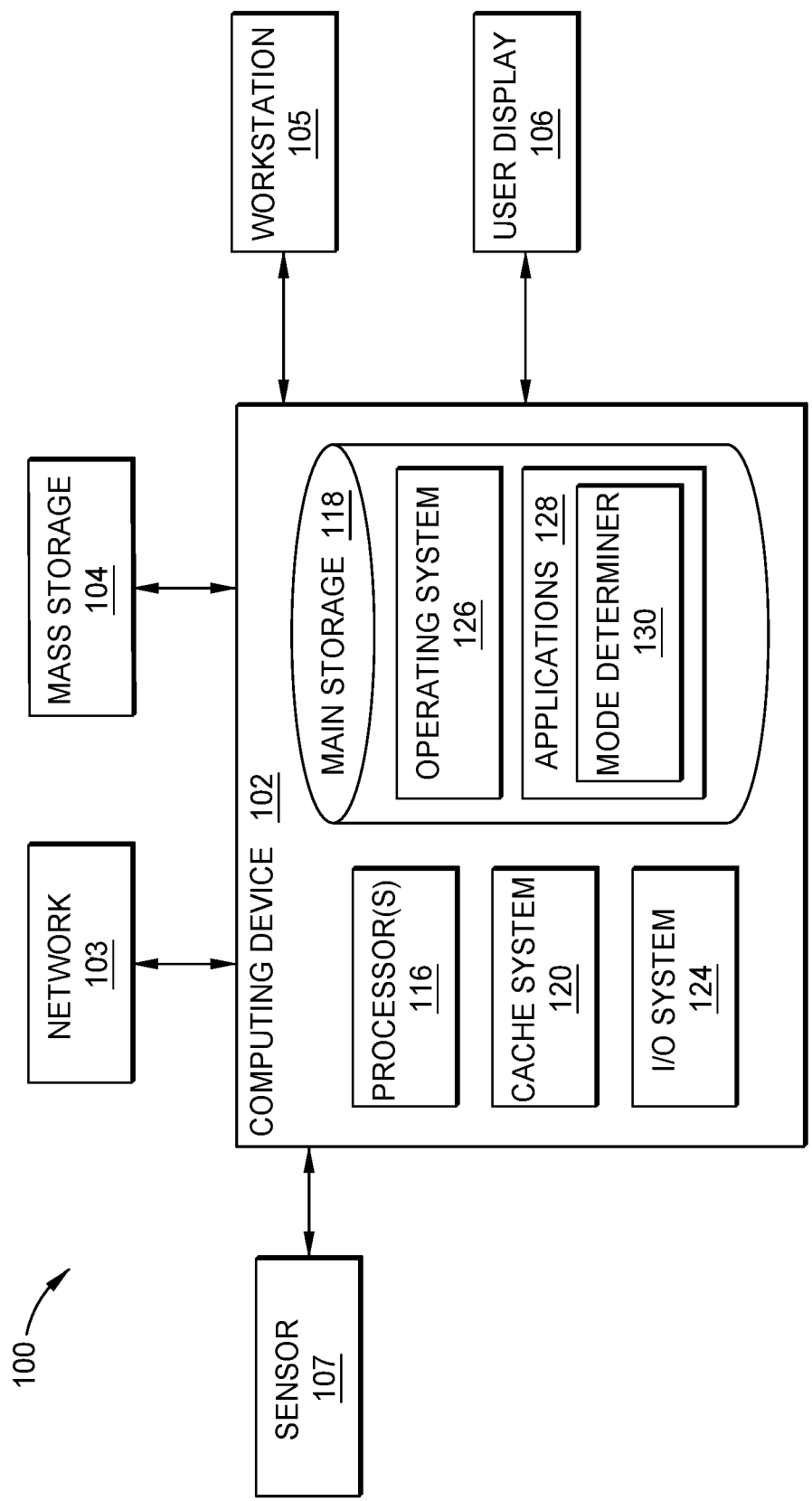
FIG. 1 is a block diagram of a system configured to determine manage a manufacturing and distribution process.

A method and a system may automatically detect an operational mode by learning from a system that watches and learns from historical sensor and other production data and achieves compact feedback in the form of modes. The modes may be determine using algorithms and models. The modes may be used as a benchmark against which the system may determine if similar production conditions have been present in the past, or if a new mode may be identified. The modes may be used to recommend better control actions or to automatically change control parameters. If a new mode is identified, the new mode may be saved to expand the memory and knowledge of the system.

An embodiment of a system may compute historical benchmarking of a detected mode against historical plant data when the plant lived in the same mode. The system may use the detected mode as a basis for identifying the similar time periods from history. For instance, time periods from history may be identified when the same mode was active. The system may further use factor analysis on the set of process variables that jointly define the detected mode to identify the key difference in terms of the current variable values versus the historical variable values. The method may then compute and display to a site-wide lead on the possible root cause of the low levels of operation/production.

An embodiment of the system may provide mode determination automation. The mode determination automation may identify different operation modes rooted from changes of physical configuration. The determination may be made without prior knowledge of plant operation and configuration (e.g., hard modes).

An embodiment of the system may identify hidden modes due to flow or production level changes (e.g., soft modes). The system may provide verification to allow a site wide leader (SWL) to confirm mode detected and enable production management.

In one embodiment of a specific approach, a certain quantity may be going lower or higher with respect to certain thresholds, such as statistical process charts/control (SPC). The embodiment of the method may generate a set of flags as an initial input for mode generation. The system may invoke a reduction procedure to change the initial inputs to a mode. Multiple physical configuration or production level layouts may be mapped into a single mode.

In an embodiment of an automatic approach, a method may include long term short memory (LSTM) auto encoding with a cluster approach. The method may invoke a time series based auto encoding process to reduce dimensions of a sensor tag spaces to limited embedding space. The system may additionally invoke a clustering method to generate potential modes.

In another embodiment of the automatic approach, the system may use a fused lasso algorithm. The method may invoke a penalized optimization formulation to generate an optimal piece-wise constant signal approximation to each flowrate sensor. The system may invoke clustering on the piece-wise constant levels to generate potential modes.

More specifically regarding LTSM encoding, an embodiment of the system may include an auto-encoder is to learn a representation (e.g., encoding) for a set of data, typically for the purpose of dimensionality reduction. The auto-encoder according to an embodiment may include a type of artificial neural network used to learn efficient data coding in an unsupervised manner. LSTM auto encoding includes building an LSTM auto-encoder with the goal of getting a fixed sized vector from a sequence.

Regarding the fused lasso approach, and single tag level mode detection, continuous flow processes may operate at various levels of flow rates due to varied reasons. Illustrative reasons may include maintenance, capacity loss, and inventory management related production strategy, among other considerations.

An embodiment of the system may automatically discover various levels of operation from sensor data. More particularly, the system may construct a piece-wise constant compressed approximation (plus noise) associated with each flow rate variable of interest. A penalized square-loss minimization may be applied between the original signal and the approximation, where penalty is applied to successive differences. This feature may incentivize run-lengths at a certain set of various levels. An embodiment of the algorithm may include:

$$\frac{1}{2}\|x-\beta\|_2^2 + \lambda_1\|D\beta\|_1 + \lambda_2\|\beta\|_1$$

$$D = \begin{pmatrix} -1 & 1 & 0 & 0 & \ldots & 0 \\ 0 & -1 & 1 & 0 & \ldots & 0 \\ & & & \ldots & & \\ 0 & 0 & 0 & \ldots & -1 & 1 \end{pmatrix}$$

Where both x and $\beta$ are both time series with same the length, and D is a metric with the size of n×n, where n is the length of the two time series.

The penalty parameter may be tuned as a trade-off between a number of levels discovered versus a quality of signal approximation (e.g., a high penalty=> small number of levels and correspondingly poorer quality of approximation; and a low penalty=> large number of levels, and correspondingly higher quality of approximation).

A low penalty may be used to achieve a high quality of approximation, and a large number of piece wise constant levels. A clustering step may follow that performs K-means clustering on piecewise constant levels to reduce the large number of levels to a desired, tractable number of operational modes (e.g., levels of operation). A cluster-center may serve as the level of the mode.

In the case of multivariate extensions and operational level discovery in a continuous flow process, an embodiment of the system may discover jointly applicable levels of operations/flow on more than one flow rate variable of interest. Each level may be a set of constants, one corresponding to each flow rate variable, instead of a scalar (i.e. the only flow rate variable in a univariate case).

The system may accomplish extensions in multiple ways. In a first approach, the system may choose a primary flow rate variable and perform a univariate level discovery. The system may induce a corresponding level on each of the other flow rate variables. For instance, the system may partition the sensor data according to the run-lengths discovered on the common time-line according to the above processes, and may represent each of the other flow rate variables as a constant over each such run-length using a mean/median.

According to a second approach, the system may perform a univariate level discovery as explained herein on each flow rate variable of interest, without doing the univariate clustering step (i.e. without the final step of single tag mode detection process). An embodiment of the system may perform multivariate K-means clustering across all the piece-wise constant level vectors discovered above. The clustering may reduce the large number of levels to a desired number of operational modes (e.g., levels of operation). The cluster center may include a multi-dimensional quantity and serve as a joint level of operation across multiple flow rates in a corresponding mode.

According to a particular embodiment, a method may be configured determine changes in an operational mode of a system from run-time, time-stamped multivariate plant sensor data, the method comprising using a recurrent neural network based auto encoder to encode joint dynamics of a sequence of multiple process variables into a lower dimensional compressed vector representation. Clustering the set of encoded vectors may be performed across several historical sequences over a predefined contiguous duration length into a small tractable number of historical operational modes. An operational mode includes at least one of: a level of operation/production in a continuous flow process in terms of the joint level of operation as it pertains to any set of one or more process variables, and a representation of the joint dynamics of any set of one or more process variables over a contiguous duration of predefined length, and the joint configuration of the uptime/downtime of different units that make up the process flow diagram of the process.

The clustering of an embodiment of the system may be accomplished using K-Means or the Gaussian Mixture Model. The sequence length, i.e., the contiguous duration length, over which the joint dynamics is represented, may be chosen based on autocorrelation and cross-correlation (across time) analysis over the set of process variables of interest.

In an univariate implementation, a level of operation/production in a continuous flow process in terms of the level of operation as it pertains to any one process variable may be discovered using a piece-wise constant compressed approximation (plus noise) to a variable of interest, with a penalized square-loss minimization between the original signal and such approximation, where penalty is applied to successive differences, which incentivizes "run-lengths" at a certain set of various levels. The system may use the discovered piece-wise constant levels to denote operational modes that are in terms of levels of operation/production for the variable of interest The piece-wise constant levels may be obtained by automatically tuning the penalty to a sufficiently low value in the penalized formulation, in order to obtain a large number (>100) of piece-wise constant levels for each variable, that are then clustered into a smaller tractable number of operational modes, where each cluster center servers as the level of the corresponding MODE for each process variable.

In another multivariate implementation, a level of operation/production in a continuous flow process in terms of the level of operation as it pertains to any set of more than one process variable may be discovered using a piece-wise constant compressed approximation (plus noise) for each process variable, with a penalized square-loss minimization between the original signal and such approximation, where penalty is applied to successive differences, which incentivizes "run-lengths" at a certain set of various levels. This feature may reduce each historical process variable data into a piece-wise constant vector.

The system may perform a multivariate K-means clustering across all the piece-wise constant level vectors discovered from above step, to reduce the large number of levels to a desired number of operational modes (levels of operation). A cluster center may now be a multi-dimensional quantity and serve as the joint level of operation across multiple process variables in the corresponding mode.

In a scenario when a joint configuration of the uptime/downtime of different units that make up the process flow diagram of the process, the mode may be discovered by associating each unit in the process flow diagram with a threshold level of operation below which it is considered to be down, and above which it is considered to be up. For each time-stamp, each unit may be encoded as 0/1, depending on whether it is determined to be down or up, as per the above threshold.

The bit vector spanning all the units in the process flow diagram may be a 0/1 vector whose dimension is the number of units in the process flow diagram, and whose components denote whether the corresponding unit is down or up, and this vector denotes an configurational operational mode.

An embodiment of a method may compute historical benchmarking of a detected mode against historical plant data when the plant lived in the same mode. The method may use the detected mode as a basis for identifying the similar time periods from history, i.e. time periods from history when the same mode was active. The method may further use factor analysis on the set of process variables that jointly define the detected mode to identify the key difference in terms of the current variable values versus the historical variable values. The method may then compute and display to a site-wide lead on the possible root cause of the low levels of operation/production.

An embodiment of a system provides an analytic approach to identify or classify modes over a complex manufacture process. The system may provide a detailed or general multivariate and joint-dynamics driven mode identification, and as a byproduct, also achieves a partitioning of un-partitioned data into several subsets. Rather than relying on a rule based mode detection that requires lots of prior knowledge and stored principles, the system may provide an automatic process, providing a simpler human involvement approach to generate modes. An embodiment may focus on producing a same product, but different output levels (e.g., quantities).

FIG. 1 is a block diagram of a system 100 configured to determine operational modes of a production. The system 100 may include a computing device 102 in communication with other electronic devices 103-107. For instance, the computing device 102 may be in communication with a communications network 103, such as the Internet or an intranet, a mass storage device 104, a workstation or other computing device 105, a user display 106, and sensors 107 (e.g., from a factory production line).

The connected devices 103-107 may be configured to provide input to the computing device 102. The input may come from a user, such as spoken or motion input. The input may additionally or alternatively originate from programming being played back on or streamed through a device. The devices 103-107 may also be configured to provide output to the user.

The computing device 102 generically represents, for example, any of a number of multi-user computers such as a network server, a midrange computer, a mainframe computer, etc. However, it should be appreciated that other embodiments of the system may be implemented in other computers and data processing systems. For example, other embodiments of a system may include single-user computers such as workstations, desktop computers, portable computers, and the like, or in other programmable electronic devices (e.g., incorporating embedded controllers and the like), such as set top boxes, game machines, etc.).

The computing device 102 generally includes one or more system processors 116 coupled to a main storage 118 through one or more levels of cache memory disposed within a cache system 120. Furthermore, a main storage 122 may be coupled to a number of the external devices 103-107 via a system input/output (I/O) system 124. Any number of alternate computer architectures may be used in the alternative.

Also shown resident in main storage 118 is a typical software configuration for a computer, including an operating system 126 (which may include various components such as kernels, device drivers, runtime libraries, etc.) accessible by one or more applications 128, such as a mode determination module. Implementations may be realized with or without dedicated hardware components and/or modifications to conventional hardware components, and in particular, purely via software executing on a conventional hardware platform.

In addition, various program code described hereinafter may be identified based upon the application within which it is implemented in a specific embodiment of an implementation. However, it should be appreciated that any particular program nomenclature that follows is used merely for convenience, and thus the implementations should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments are not limited to the specific organization and allocation of program functionality described herein.

Those skilled in the art will recognize that the illustrative environment illustrated in FIG. 1 is not intended to limit the scope of other implementations. Indeed, those skilled in the art will recognize that other alternative hardware and/or software environments may be used in a manner consistent with other implementations of embodiments.

Figure 2:
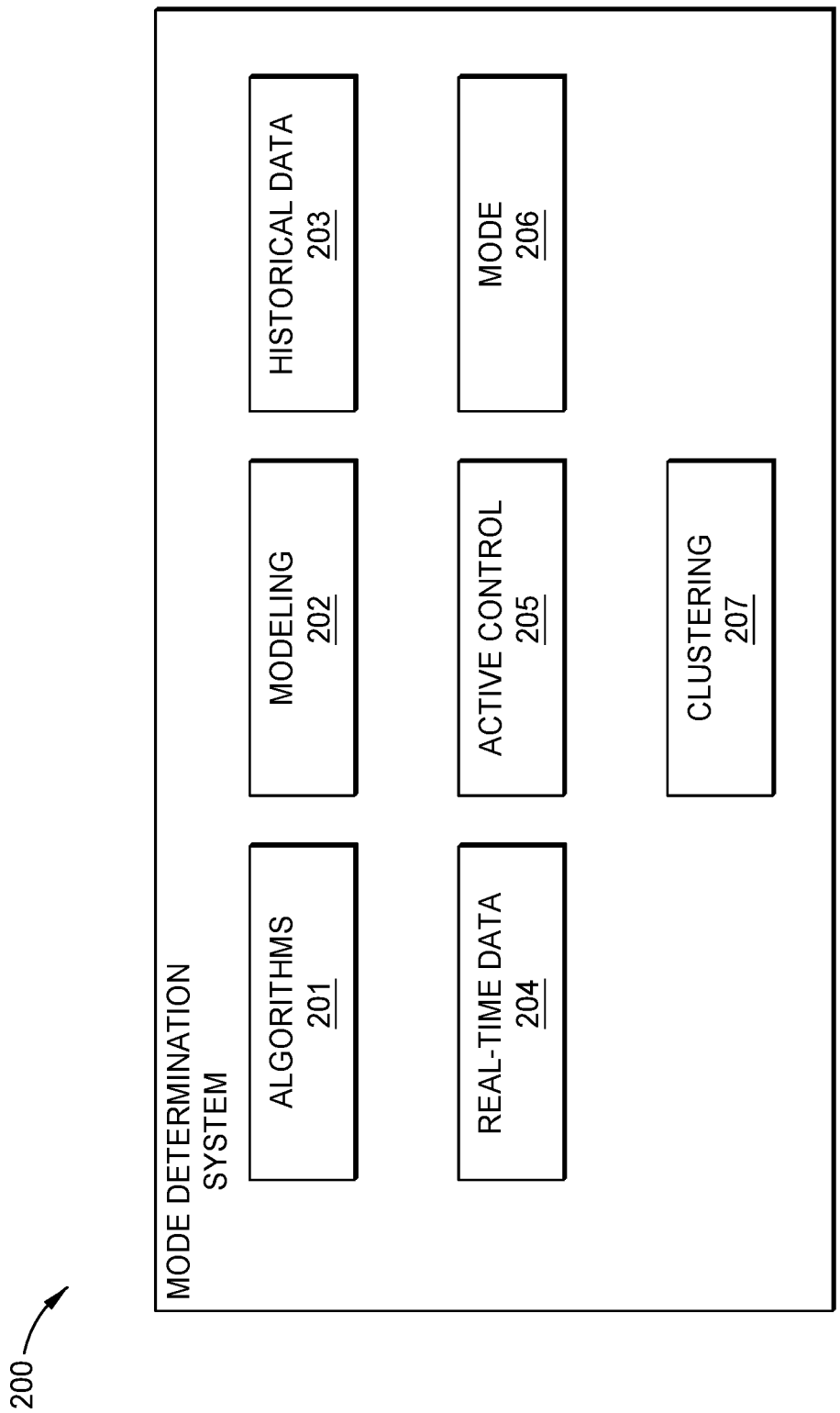
FIG. 2 is a block diagram showing a module of the system of FIG. 1 in more detail according to an embodiment of a system.

FIG. 2 is a block diagram of a system 200 according to an embodiment. The system 200 may be similar to the mode determination module 130, shown in FIG. 1. The system 200 may include algorithms 201, a modeling module 202, a historical data module 203, a real-time data module 204, an active control module 205, mode module 206, and a clustering module 207.

The modules 201-207 may automatically detect an operational mode by learning from a system that watches and learns from historical sensor and other production data and achieves compact feedback in the form of modes. The modes may be determined using algorithms and models. The modes may be used as a benchmark against which the system may determine if similar production conditions have been present in the past, or if a new mode may be identified. The modes may be used to recommend better control actions or to automatically change control parameters. If a new mode is identified, the new mode may be saved to expand the memory and knowledge of the system.

Figure 3:
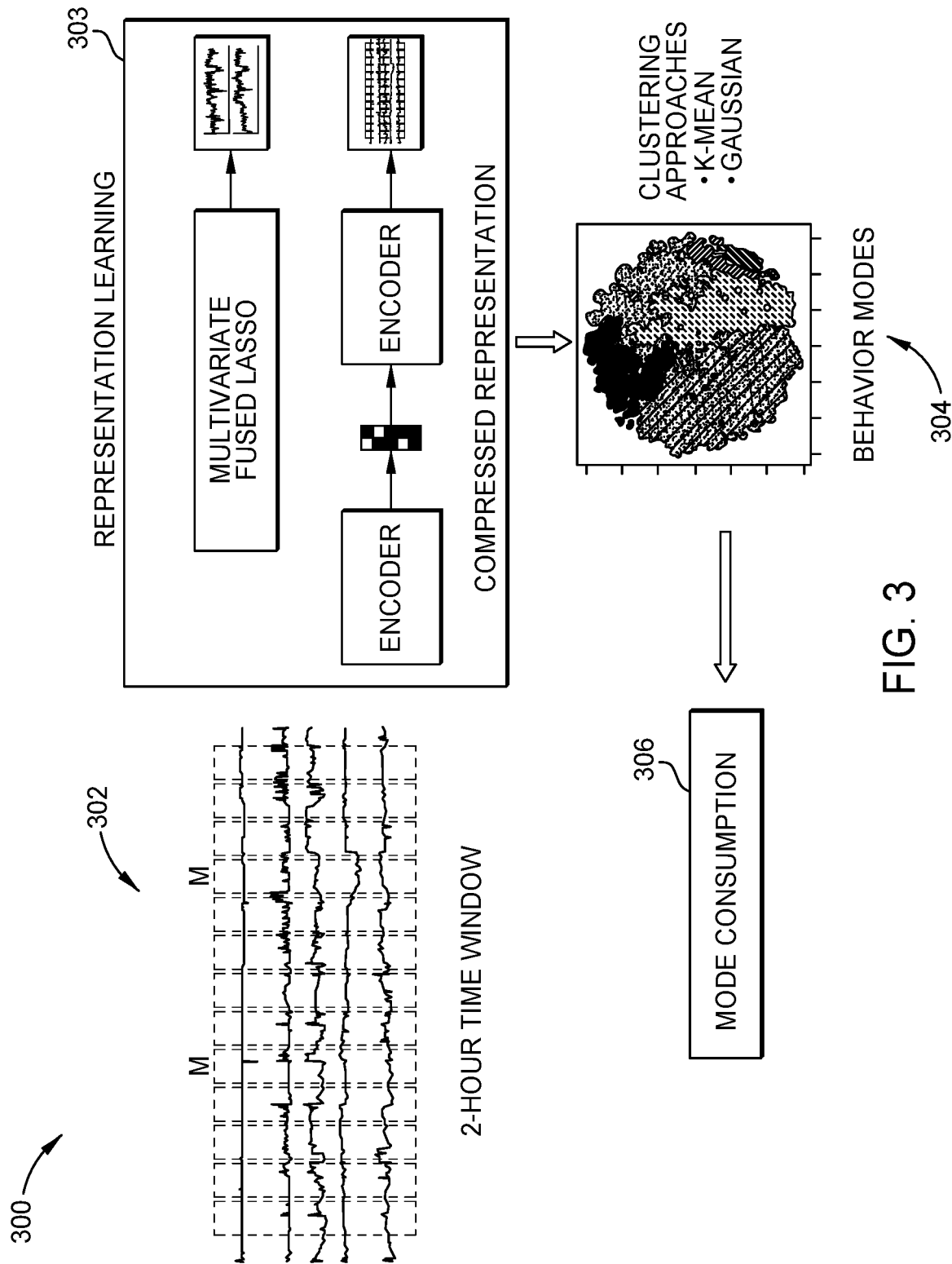
FIG. 3 is a block flow diagram representing processes used by an embodiment of the system to obtain data from different variables over a window of time to determine levels and how variables are jointly changing using representative learning.

FIG. 3 is a block flow diagram 300 representing processes used by an embodiment of the system to obtain data from different variables 302 over a window (e.g., two hours) to determine levels and how variables are jointly changing using representative learning 303. The results may be clustered to produce a two-dimensional representation 304 that may be used to determine ways that variables may jointly behave. The modes may be used as a benchmark against which the system may determine if similar production conditions have been present in the past, or if a new mode may be identified. The modes 306 may be used to recommend better control actions or to automatically change control parameters. If a new mode is identified, the new mode may be saved to expand the memory and knowledge of the system.

Figure 4:
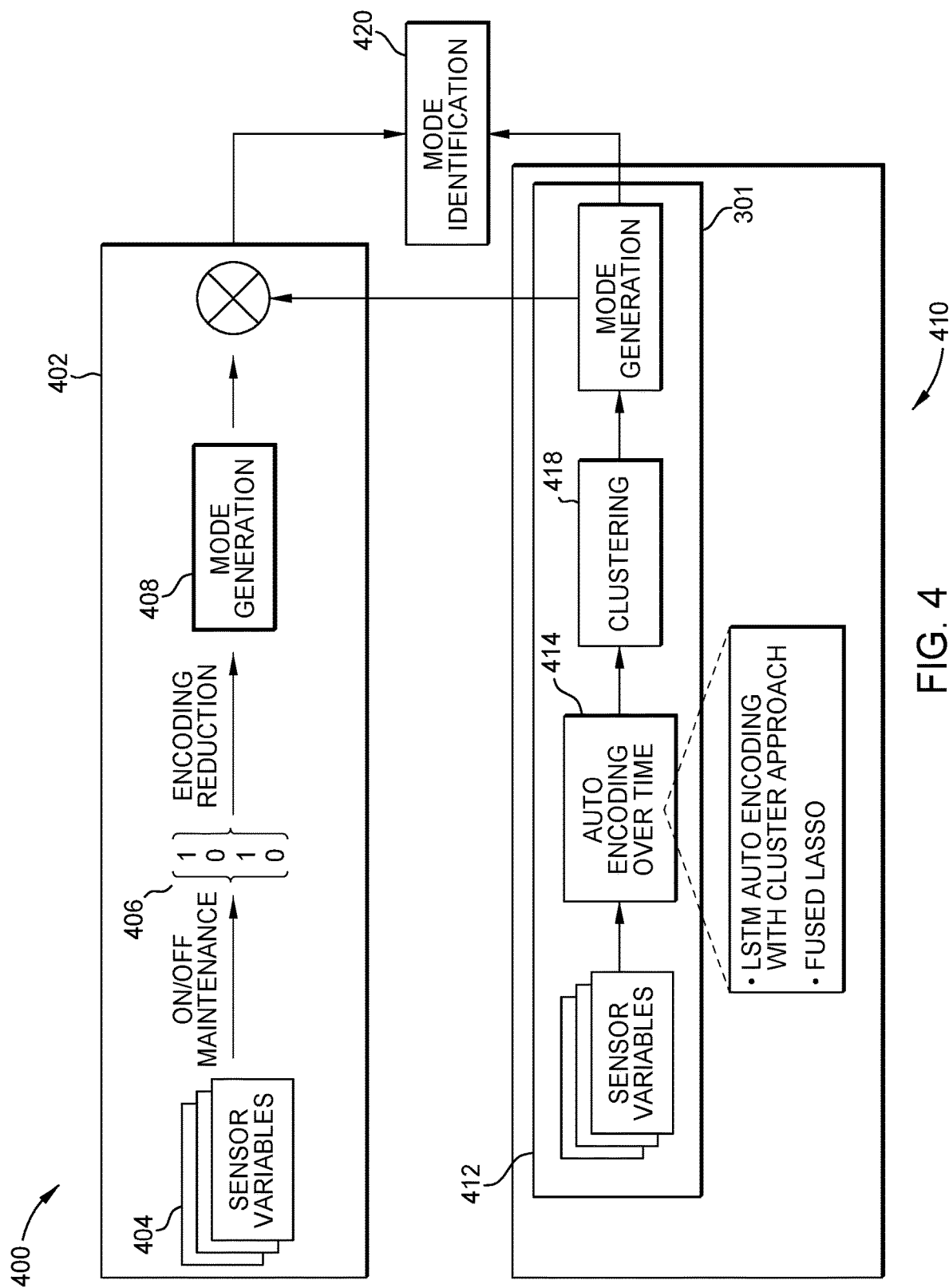
FIG. 4 is a block diagram of a flow process an embodiment of a dual approach method of mode generation as described herein.

FIG. 4 is a flow diagram 400 of an embodiment of the dual approach system and method of mode generation as described above. The system and associated processes used to automatically determine operational modes of a production plant using real-time, time-stamped multivariate plant sensor data. The system more particularly shows manners in which different modes may be determined. For instance, a top path 402 represents how a system may use uptime and downtime data from sensors 404 across different units. The system may utilize a bit I/O vector 406 (e.g., corresponding to operational status) as mode a definition 408. A bottom path 410 may represent how level discovery 412 and joint variable representation may undergo encoding 414 and clustering 418 to make modes identifiable 420, tractable, and useable at runtime.

The modes may be used as a benchmark against which the system may determine if similar production conditions have been present in the past, or if a new mode may be identified. The modes may be used to recommend better control actions or to automatically change control parameters. If a new mode is identified, the new mode may be saved to expand the memory and knowledge of the system.

Figure 5:
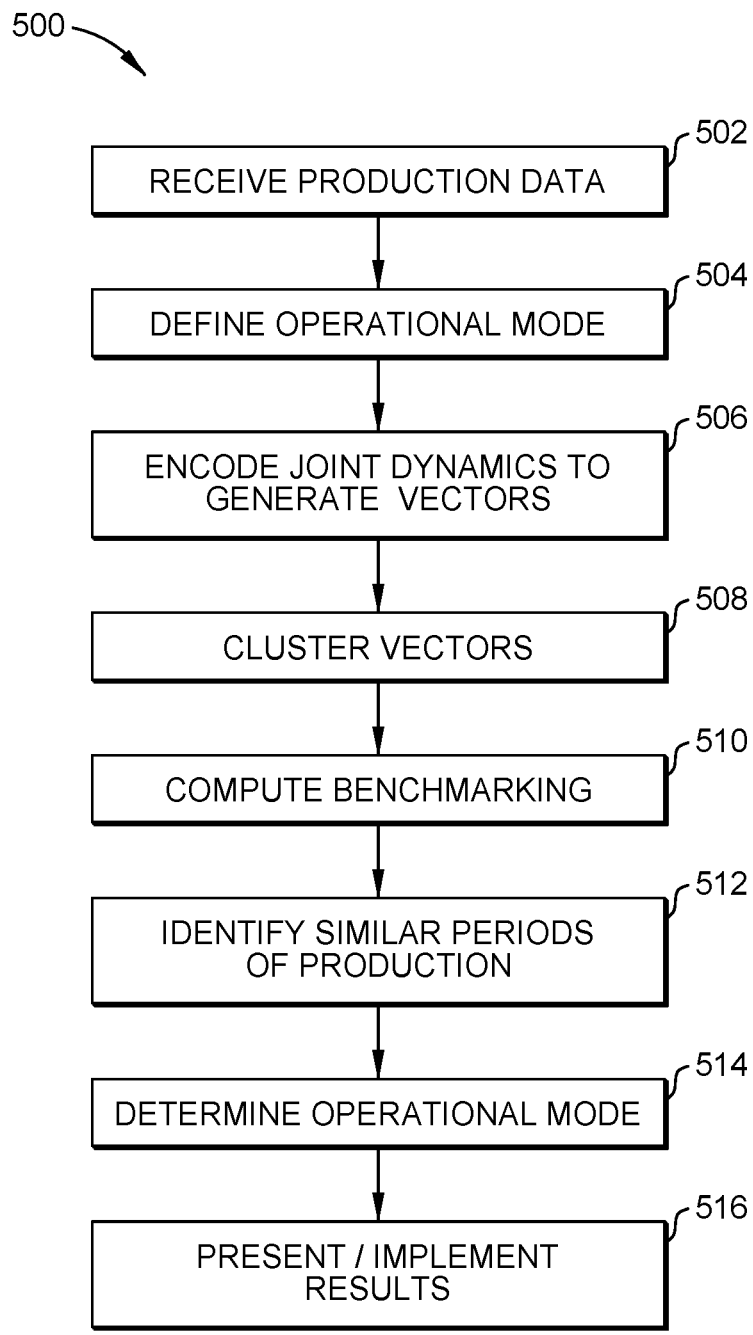
FIG. 5 is a flowchart of an embodiment of a method of determining an operational mode of a system from real-time, time-stamped multivariate plant sensor data.

FIG. 5 is flowchart of an embodiment of a method 500 may be configured determine changes in an operational mode of a system from run-time, time-stamped multivariate plant sensor data. The method may include receiving the real-time, time-stamped production data at 502.

An operational mode may be defined at 504. An operational mode includes at least one of: a level of operation/production in a continuous flow process in terms of the joint level of operation as it pertains to any set of one or more process variables, and a representation of the joint dynamics of any set of one or more process variables over a contiguous duration of predefined length, and the joint configuration of the uptime/downtime of different units that make up the process flow diagram of the process.

At 506, the method may include using a recurrent neural network based auto encoder to encode joint dynamics of a sequence of multiple process variables into a lower dimensional compressed vector representation, or mode.

Clustering the set of encoded vectors may be performed at 508 across several historical sequences over a predefined contiguous duration length. The results may include a small tractable number of historical operational modes.

An embodiment of the method 500 may compute historical benchmarking of a detected mode against historical plant data when the plant was in the same mode at 510. The method 500 may use the detected mode as a basis for identifying the similar time periods from history at 512, i.e. time periods from history when the same mode was active. The method 500 may further use factor analysis on the set of process variables that jointly define and determine the detected mode to identify the key difference in terms of the current variable values versus the historical variable values 514.

The method 500 may then compute and display to a site-wide lead on the possible root cause of the low levels of operation/production 516. Another embodiment of the method 500 may automatically modify production controls based on the mode determinations.

Figure 6:
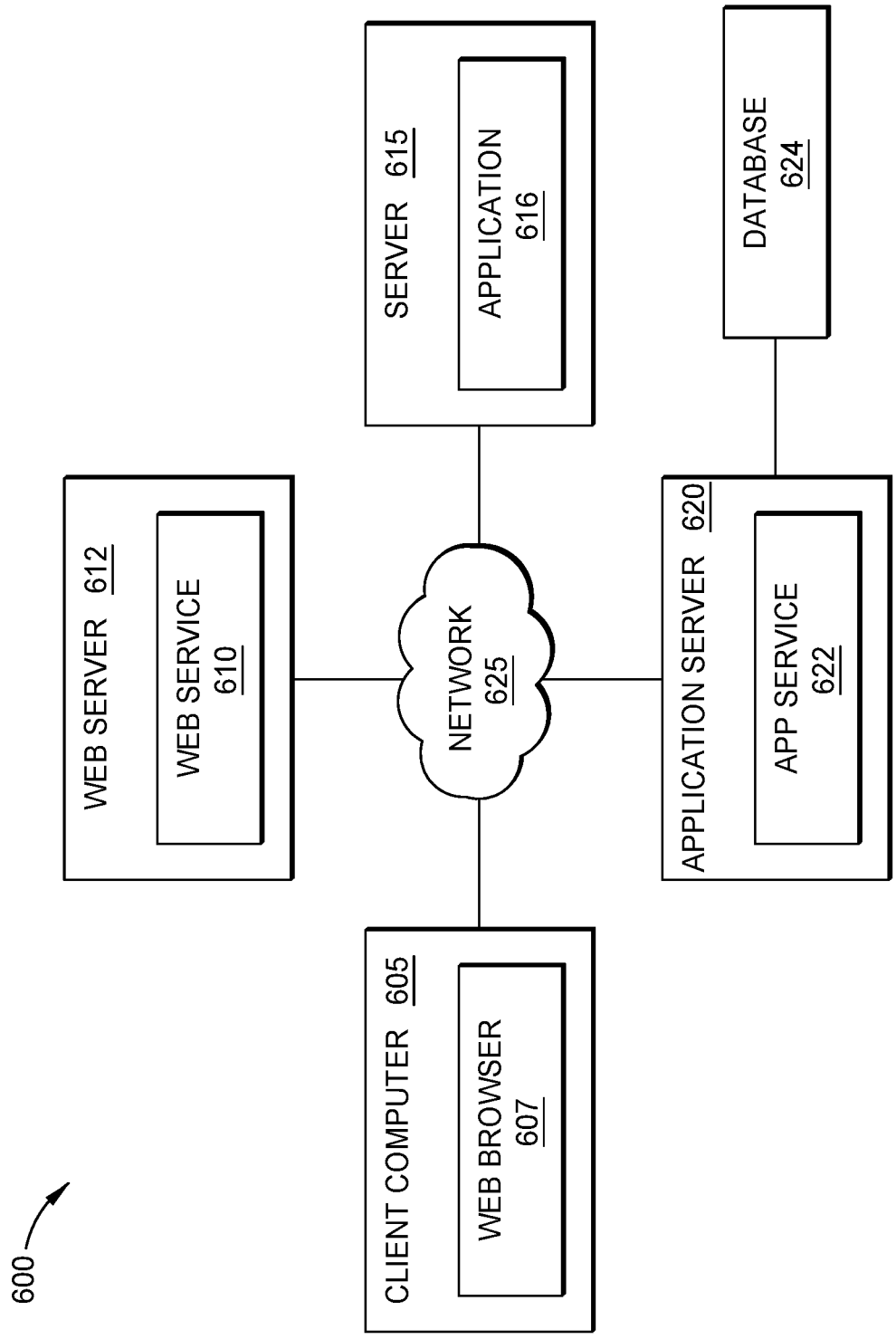
FIG. 6 illustrates another example computing system according to one embodiment, such as may be realized using a networked environment.

FIG. 6 illustrates another example computing system according to one embodiment, such as may be realized using a networked environment. As shown, the computing environment 600 includes a client computer 605, a web server 610, a server 615, an application 616, and an application server 620. The client computer 605 may be a physical system (e.g., a desktop, laptop computer, mobile device, etc.) or a virtual computing instance executing in the cloud. The client computer 605 includes a web browser 607. A user may access data services through the web browser 607 over a network 625 (e.g., the Internet).

For instance, a user may access a web service 612 executing on a web server 610. In one embodiment, the web service 612 provides a web interface for an application server 620 (e.g., executing an application service 622). More specifically, the application service 622 provides a database 624. The database 624 may include data presented to users on the web browser 607.

Figure 7:
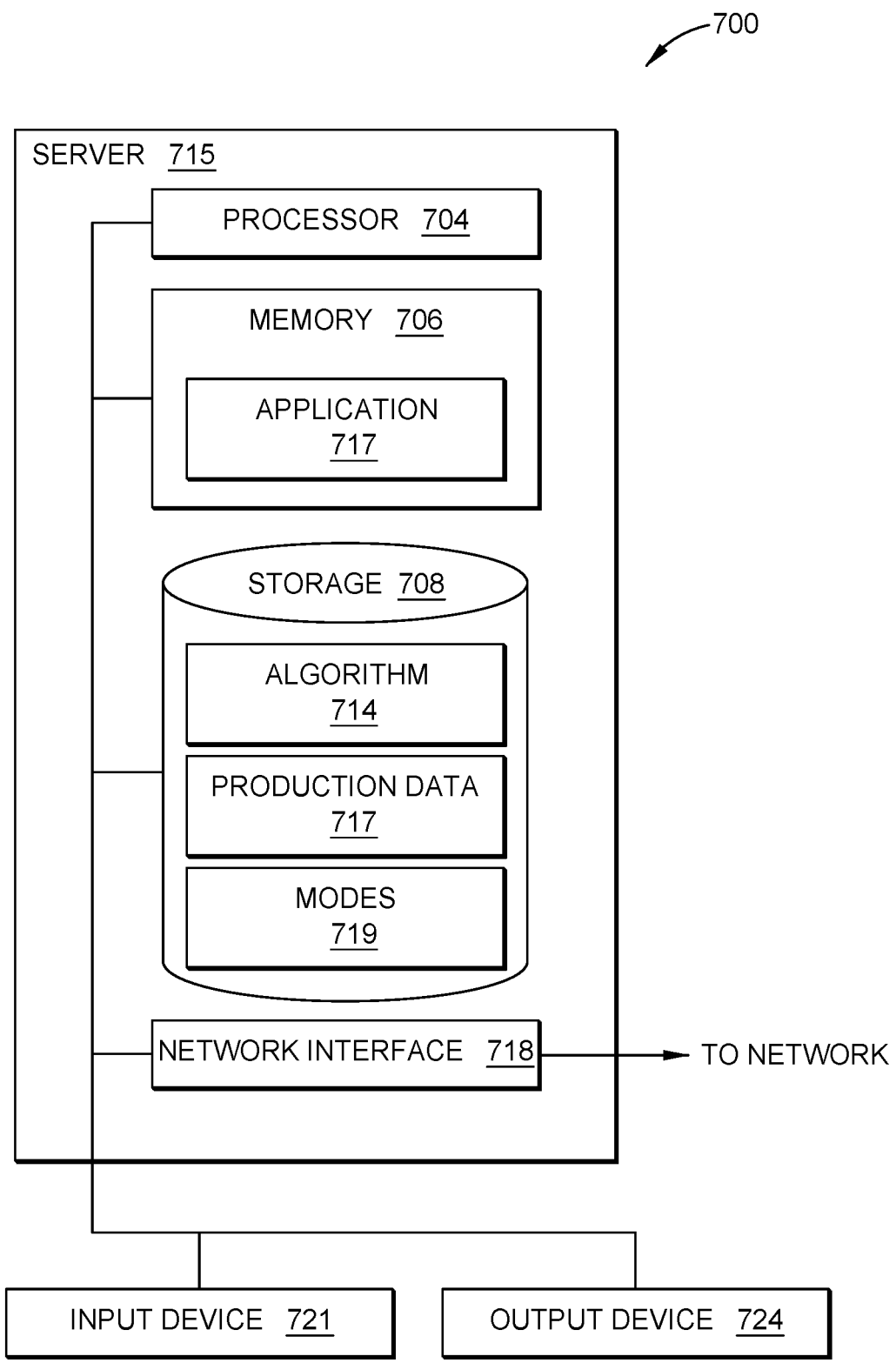
FIG. 7 further illustrates a server, such as the server of FIG. 6, according to one embodiment.

FIG. 7 further illustrates a server 715, such as the server 615 of FIG. 6, according to one embodiment. The server 715 generally includes a processor 704 connected via a bus to a memory 706, a network interface device 718, a storage 708, an input device 721, and an output device 724. The server 715 is generally under the control of an operating system. Examples of operating systems include the UNIX operating system, versions of the Microsoft Windows operating system, and distributions of the Linux operating system (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both). More generally, any operating system supporting the functions disclosed herein may be used. The processor 704 is included to be representative of a single CPU, multiple CPUs, a single CPU having multiple processing cores, and the like. Similarly, the memory 706 may be a random access memory. While the memory 706 is shown as a single identity, it should be understood that the memory 706 may comprise a plurality of modules, and that the memory 706 may exist at multiple levels, from high speed registers and caches to lower speed but larger DRAM chips. The network interface device 718 may be any type of network communications device allowing the navigation server 710 to communicate with other computers via the network 725.

The storage 708 may be a persistent storage device. Although the storage 708 is shown as a single unit, the storage 708 may be a combination of fixed and/or removable storage devices, such as fixed disc drives, solid state drives, removable memory cards, optical storage and network storage systems.

As shown, the memory 706 contains the application 717, which may be an application generally executed to take actions described herein. Storage 708 contains the algorithms 714, production (historical and real-time) data 717, and modes 719.

The input device 721 may provide a keyboard and/or a mouse, etc. The output device 724 may be any conventional display screen. Although shown separately from the input device 721, the output device 724 and input device 721 may be combined. For example, a display screen with an integrated touch-screen may be used.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the mode determination processes could execute on a computing system in the cloud and. In such a case, the Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:
   receiving a time sequence of real-time, multivariate sensor data for a plant measured while the plant was converting sand oil into synthesis crude oil, wherein the time sequence of real-time, multivariate sensor data comprises a quality of bitumen extracted from the sand oil, and wherein the time sequence of real-time, multivariate sensor data indicates an active operational mode existing at the plant;
   encoding, using an auto encoder, the time sequence of real-time, multivariate sensor data into a lower dimensional vector representing the time sequence of real-time, multivariate sensor data;
   clustering the lower dimensional vector into a cluster representing a historical operational mode that was previously active at the plant;
   in response to the lower dimensional vector being clustered into the cluster representing the historical operation mode, determining that the active operation mode existing at the plant is the historical operational mode that was previously active at the plant;
   in response to determining that the active operation mode existing at the plant is the historical operational mode that was previously active at the plant, determining historical, multivariate sensor data for the plant when the historical operational mode was active at the plant;
   identifying a difference between the time sequence of real-time multivariate sensor data and the historical, multivariate sensor data;
   determining, based on the difference, that a production condition exists at the plant and a root cause for the production condition; and adjusting a control parameter for converting the sand oil into synthesis crude oil based on the difference to resolve the root cause of the production condition.

2. The method of claim 1, wherein the time sequence of real-time, multivariate sensor data indicates at least one of: a level of operation in a continuous flow process relating to a joint set of process variables, a representation of a joint dynamic of the set of process variables over a predefined length, and a joint configuration of an uptime/downtime of a plurality of units comprising a process flow.

3. The method of claim 2, further comprising inducing a plurality of corresponding levels respectively on a plurality of sets of process variables, wherein the plurality of sets of process variables includes the set of process variables, to determine for each such set of process variables of the plurality of sets of process variables, a set of joint, mutually compatible levels of operations spanning each set of process variables of the plurality of sets of process variables, wherein the levels of operation are associated with levels of flow rates in a continuous flow process.

4. The method of claim 2, further comprising partitioning sensor data according to run-lengths discovered on a common time-line for a primary process variable of the set of process variables.

5. The method of claim 2, wherein a bit vector encodes the joint configuration of the uptime/downtime of a plurality of units comprising a process flow.

6. The method of claim 1, wherein clustering the lower dimensional vector further includes using a K-means or Gaussian mixture model.

7. The method of claim 1, further comprising using a piece-wise constant compressed approximation with a penalized square-loss minimization between an original signal and an approximation, where a penalty is applied to successive differences.

8. The method of claim 1, further comprising perform a multivariate clustering operation across a plurality of piece-wise constant level vectors.

9. A system comprising:
a memory; and
a hardware processor communicatively coupled to the memory, the hardware processor configured to:
receive a time sequence of real-time, multivariate sensor data for a plant measured while the plant was converting sand oil into synthesis crude oil, wherein the time sequence of real-time, multivariate sensor data comprises a quality of bitumen extracted from the sand oil, and wherein the time sequence of real-time, multivariate sensor data indicates an active operational mode existing at the plant;
encode, using an auto encoder, the time sequence of real-time, multivariate sensor data into a lower dimensional vector representing the time sequence of real-time, multivariate sensor data;
cluster the lower dimensional vector into a cluster representing a historical operational mode that was previously active at the plant;
in response to the lower dimensional vector being clustered into the cluster representing the historical operation mode, determine that the active operation mode existing at the plant is the historical operational mode that was previously active at the plant;
in response to determining that the active operation mode existing at the plant is the historical operational mode that was previously active at the plant, determine historical, multivariate sensor data for the plant when the historical operational mode was active at the plant;
identify a difference between the time sequence of real-time, multivariate sensor data and the historical, multivariate sensor data;
determine, based on the difference, that a production condition exists at the plant and a root cause for the production condition; and
adjust a control parameter for converting the sand oil into synthesis crude oil based on the difference to resolve the root cause of the production condition.

10. The system of claim 9, wherein the time sequence of real-time, multivariate sensor data indicates at least one of: a level of operation in a continuous flow process relating to a joint set of process variables, a representation of a joint dynamic of the set of process variables over a predefined length, and a joint configuration of an uptime/downtime of a plurality of units comprising a process flow.

11. The system of claim 10, wherein the hardware processor is further configured to induce a plurality of corresponding levels respectively on a plurality of sets of process variables, wherein the plurality of sets of process variables includes the set of process variables, to determine for each such set of process variables of the plurality of sets of process variables, a set of joint, mutually compatible levels of operations spanning each set of process variables of the plurality of sets of process variables, wherein the levels of operation are associated with levels of flow rates in a continuous flow process.

12. The system of claim 9, wherein the hardware processor is further configured to use a piece-wise constant compressed approximation with a penalized square-loss minimization between an original signal and an approximation, where a penalty is applied to successive differences.

13. A computer program product to determine an operational mode of a production system from sensor data, the computer program product comprising:
a computer-readable storage medium having computer-readable program code embodied therewith, the computer-readable program code executable by one or more computer processors to:
receive a time sequence of real-time, multivariate sensor data for a plant measured while the plant was converting sand oil into synthesis crude oil, wherein the time sequence of real-time, multivariate sensor data comprises a quality of bitumen extracted from the sand oil, and wherein the time sequence of real-time, multivariate sensor data indicates an active operational mode existing at the plant;
encode, using an auto encoder, the time sequence of real-time, multivariate sensor data into a lower dimensional vector representing the time sequence of real-time, multivariate sensor data;
cluster the lower dimensional vector into a cluster representing a historical operational mode that was previously active at the plant;
in response to the lower dimensional vector being clustered into the cluster representing the historical operation mode, determine that the active operation mode existing at the plant is the historical operational mode that was previously active at the plant;
in response to determining that the active operation mode existing at the plant is the historical operational mode that was previously active at the plant, determine historical, multivariate sensor data for the plant when the historical operational mode was active at the plant;

identify a difference between the time sequence of real-time, multivariate sensor data and the historical, multivariate sensor data;

determine, based on the difference, that a production condition exists at the plant and a root cause for the production condition; and adjust a control parameter for converting the sand oil into synthesis crude oil to resolve the root cause of the production condition.

14. The program product of claim 13, wherein the program code is further configured to compare the operational mode against historical data to determine a recommended action.

\* \* \* \* \*